United States Patent
Mueller

(10) Patent No.: US 8,218,344 B2
(45) Date of Patent: Jul. 10, 2012

(54) BIDIRECTIONAL INVERTER FOR CONVERSION BETWEEN A DIRECT CURRENT SOURCE AND AN ALTERNATING CURRENT GRID

(75) Inventor: Burkard Mueller, Kassel (DE)

(73) Assignee: SMA Solar Technologies AG, Niestetal (DE)

( * ) Notice: Subject to any disclaimer, the term of this patent is extended or adjusted under 35 U.S.C. 154(b) by 0 days.

(21) Appl. No.: 13/233,430

(22) Filed: Sep. 15, 2011

(65) Prior Publication Data
US 2012/0002450 A1 Jan. 5, 2012

Related U.S. Application Data

(63) Continuation of application No. PCT/EP2010/054115, filed on Mar. 29, 2010.

(30) Foreign Application Priority Data

Mar. 30, 2009 (EP) .................................... 09004544
Aug. 5, 2009 (EP) .................................... 09010097

(51) Int. Cl.
*H02M 7/42* (2006.01)
(52) U.S. Cl. ........................................................ 363/71
(58) Field of Classification Search .................... 363/65, 363/71, 131, 132; 307/66, 77, 82
See application file for complete search history.

(56) References Cited

U.S. PATENT DOCUMENTS

| 5,191,519 A * | 3/1993 | Kawakami ........................ 363/71 |
| 5,198,971 A * | 3/1993 | Recker et al. .................... 363/71 |
| 5,508,905 A * | 4/1996 | Reichard .......................... 363/71 |
| 5,657,214 A * | 8/1997 | Nguyen et al. ................... 363/41 |
| 6,847,196 B2 | 1/2005 | Garabandic |
| 7,839,023 B2 * | 11/2010 | Jacobson et al. ................ 307/77 |
| 7,924,583 B2 * | 4/2011 | Miettinen ........................ 363/65 |
| 2005/0286281 A1 | 12/2005 | Victor et al. |
| 2011/0140535 A1 * | 6/2011 | Choi et al. ...................... 307/82 |
| 2011/0144822 A1 * | 6/2011 | Choi ............................. 700/297 |

FOREIGN PATENT DOCUMENTS

DE 4017207 A1 12/1991
EP 1369985 A2 12/2003

OTHER PUBLICATIONS

European Search Report Dated Sep. 24, 2009 for Application No. EP 09004544.4. 3 Pages.
European Search Report Dated Sep. 25, 2009 for Application No. EP 09010097.5. 3 Pages
International Search Report Dated Jul. 20, 2010 for Application No. PCT/EP2010/054115. 16 Pages.
Salmon J et al: 'PWM Inverters Using Split-Wound Coupled Inductors' Industry Applications Society Annual Meeting, 2008. IAS '08. IEEE, IEEE, Piscataway, NJ, USA, Oct. 5, 2008, pp. 1-8. 8 Pages.

* cited by examiner

*Primary Examiner* — Adolf Berhane
(74) *Attorney, Agent, or Firm* — Eschweiler & Associates, LLC

(57) ABSTRACT

A bidirectional inverter is disclosed, the inverter including DC terminals and being connectable to a grid via grid AC terminals. The inverter includes a first subinverter and a second subinverter, both subinverters being connected in parallel to the DC terminals, and being connected in parallel to the grid AC terminals by subinverter AC terminals. Each subinverter includes a full bridge and a switchable freewheel path, both being configured to drive current between the grid AC terminals in a driving direction, and configured to block a current between the grid AC terminals in a blocking direction opposite the driving direction. The driving direction of the first subinverter is the blocking direction of the second subinverter.

20 Claims, 8 Drawing Sheets

BIDIRECTIONAL INVERTER FOR CONVERSION BETWEEN A DIRECT CURRENT SOURCE AND AN ALTERNATING CURRENT GRID

REFERENCE TO RELATED APPLICATIONS

This application is a continuation of International Application No. PCT/EP2010/054115, filed Mar. 29, 2010, which claims priority to European Patent Application No. 09004544.4, filed Mar. 30, 2009, and European Patent Application No. 09010097.5, filed Aug. 5, 2009.

FIELD

The invention relates to a bidirectional inverter for conversion between a direct current and an alternating current, particularly for use in a photovoltaic system.

BACKGROUND

Bidirectional inverters are capable of transferring energy both from the DC side to the AC side and from the AC side to the DC side. An example of this requirement is the provision of reactive power on the AC side of the inverter. In this case the inverter only has to transfer energy from the DC side to the AC side during part of the grid period, whereas for the rest of the time the energy flow reverses.

For inverters that use so called IGBT components as semiconductor switches, this requirement generally does not pose a problem if a diode is connected antiparallel to each IGBT. When the energy flow reverses, current flows through the diode instead of the IGBT. However, if other semiconductor switches such as a MOSFET are used, with internal, parasitic diodes, problems often occur with the internal, parasitic diodes in these components. These diodes are usually very poorly suited to the switching operation as they have a high reverse recovery charge and a hard cut-off of the current when commutating. However, it cannot be avoided that when the energy flow reverses, these diodes take over the current just like the diodes that are specifically fitted antiparallel to the IGBTs. The internal, parasitic diodes then may cause switching loss as a result of their recovered charge and may provide poor EMC properties as a result of the hard cut-off of the current. Special circuit arrangements therefore may have to be used if bidirectional inverters are built using MOSFET or comparable semiconductors as switches.

One such circuit is known from U.S. Pat. No. 6,847,196. Here a DC/AC converter with four switches and current paths separated by additional, saturable chokes is used. Four additional freewheel diodes are present. This arrangement reduces or prevents current flowing through the antiparallel diodes that are present internally in the switches. However, a disadvantage in this circuit is that decoupling between the DC source and the circuit arrangement does not occur in any switching state. Therefore, as with any conventional full bridge, in the event of a switching operation in only one half of the bridge, a voltage discontinuity occurs between the input side and output side. If the output side of the inverter is connected to the public grid and therefore grounded, the input side potential changes in a step-like manner compared to the ground potential. This is disadvantageous for photovoltaic generators as a source, for example, as due to their design they have a high capacitance with regard to the enclosure, with the result that undesired capacitive parasitic currents and/or dangerous contact voltages can occur.

High-frequency potential discontinuities can only be avoided with this circuit if both halves of the bridge are switched simultaneously, which however reduces the efficiency of the circuit. Alternatively, a transformer could be connected downstream of the circuit on the grid side. But in this case the overall efficiency is reduced as well.

The German patent specification DE 102004030912 describes a photovoltaic inverter that comprises four bridge switches and an additional decoupling switch outside of the bridge and in the DC circuit. This circuit solves the problem of the high-frequency parasitic currents with reasonable efficiency. During the freewheel phases, a freewheel path, in which the freewheel current flows, is separated from the photovoltaic generator by the decoupling switch. As a result, the potential discontinuities and charging of the parasitic capacitance between generator and ground is avoided, so that corresponding high-frequency parasitic currents are diminished.

The disadvantage of this circuit is that with bidirectional operation optimum components cannot be used for the switches and diodes. Due to the different energy flow directions, antiparallel diodes must be provided for all semiconductor switches. If MOSFET or comparable transistors are used as switches, however, their internal, parasitic diodes still take over some of the current with the negative effects already described.

Another solution to the problem of high-frequency parasitic currents is described in EP 1369985. Here a conventional full bridge with four bridge switches is complemented by two switchable connecting paths between the bridge outputs, with the result that likewise a freewheel path with floating potential that can be decoupled from the DC side is created. Here too, however, at least for the bridge semiconductors, antiparallel diodes have to be provided, with the result that certain semiconductor types like MOSFET cannot be used without problems.

It is therefore desirable to find a simplified, bidirectional, and transformerless inverter topology, in particular for the use with photovoltaic generators, which avoids potential discontinuities between the AC side and the DC side while providing a high conversion efficiency.

SUMMARY

A bidirectional inverter is disclosed, the inverter comprising DC terminals and being connectable to a grid via grid AC terminals. The inverter comprises a first subinverter and a second subinverter, both subinverters being connected in parallel to the DC terminals, and being connected in parallel to the grid AC terminals by subinverter AC terminals. Each subinverter comprises a full bridge and a switchable freewheel path, both being configured to drive a current between the grid AC terminals in a driving direction, and configured to block a current between the grid AC terminals in a blocking direction opposite the driving direction. The driving direction of the first subinverter is the blocking direction of the second subinverter. The switchable freewheel path may be configured to be potential-free, or at least temporarily decoupled from the DC terminals.

In a further aspect, a bidirectional inverter is disclosed, the inverter comprising two DC terminals, a first AC grid terminal and a second AC grid terminal. The inverter further comprises a first full bridge with a first and a second AC terminal, and a second full bridge with a first further AC terminal and a second further AC terminal. The first full bridge and the second full bridge are connected to the DC terminals. A plurality of coupling inductors interlink the AC terminals of the first and second full bridges so as to allow, in each of the full bridges, a current flow only in a single direction, thereby providing a switchable, potential-free freewheel path to each of the full bridges. The first full bridge and the second full bridge are each configured to drive a current in excess of a leakage current of semiconductor switches included in the full bridges in a direction flowing out of the first AC terminal and the first further AC terminal and into the second AC terminal and the second further AC terminal.

In a third aspect, a bidirectional inverter is disclosed, the inverter comprising DC terminals and being connectable to a three-phase grid via a first, a second and a third grid AC terminal. The inverter comprises a first, a second, and a third subinverter, all subinverters being connected in parallel to the DC terminals. Each subinverter is connected to two of the grid AC terminals and comprises a full bridge and a switchable freewheel path configured to drive a current between the two of the grid AC terminals in a driving direction, and to block a current between the two of the grid AC terminals in a blocking direction opposite the driving direction. The first subinverter is connected to the first AC terminal and the second AC terminal, the second subinverter is connected to the second and the third AC terminal, and the third subinverter is connected to the third and the first AC terminal.

BRIEF DESCRIPTION OF THE DRAWINGS

The invention will be explained in more detail below on the basis of examples of embodiments and with reference to the figures of the drawing, in which.

DETAILED DESCRIPTION

Figure 1:
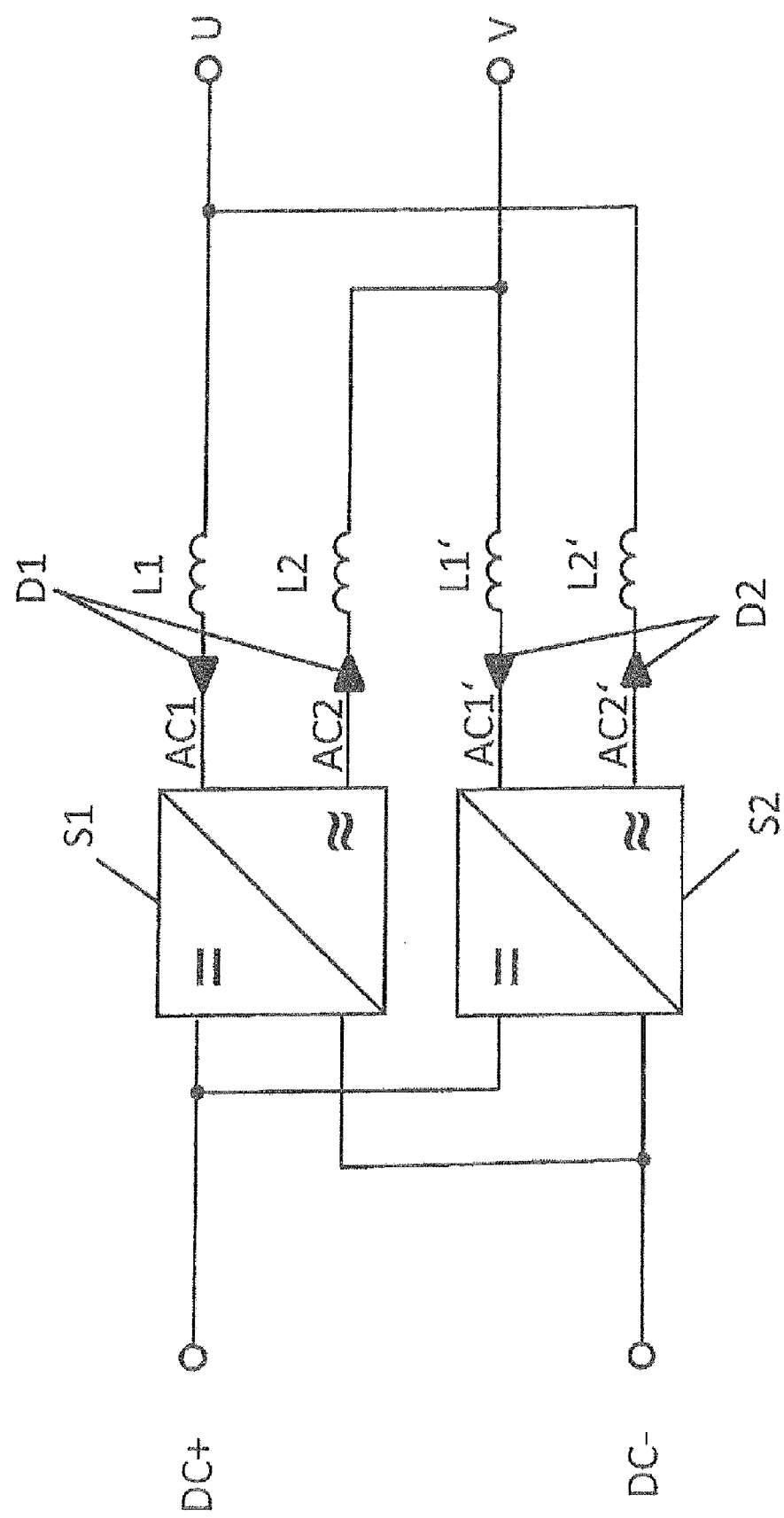
FIG. 1 shows a bidirectional inverter with two subinverters.

FIG. 1 shows a bidirectional inverter with a first subinverter S1 and a second subinverter S2 connected in parallel to DC terminals DC+, DC−. The DC terminals DC+, DC− may be connected to a DC power source, such as a solar panel, a fuel cell, a battery or the like. Each subinverter S1, S2 further comprises two AC terminals AC1, AC2, and AC1', AC2', respectively, and is configured to drive a current between the AC terminals AC1, AC2, AC1', AC2' in a driving direction, and configured to block a current between the AC terminals AC1, AC2, AC1', AC2' in a blocking direction opposite the driving direction. The driving direction is indicated by arrows D1, D2 shown for subinverters S1, S2. The subinverter AC terminals AC1, AC2, AC1', AC2' are coupled to grid AC terminals U, V via inductors L1, L2, L1', L2', which may be separate inductor elements as shown. Each AC terminal of a subinverter is coupled to one of the grid AC terminals, so that the subinverters S1, S2 are connected in parallel to the grid AC terminals U, V. As shown, the first AC terminal AC1 of subinverter S1 is connected together with the second AC terminal AC2' to grid AC terminal U, while the second AC terminal AC2 of subinverter S1 is connected together with the first AC terminal AC1' to grid AC terminal V. In this configuration, any direction of a current provided via the grid AC terminals U, V is the driving direction of one of the subinverters S1, S2, and the blocking direction of the other subinverter. As a consequence, an alternating current at the grid AC terminals U, V is alternatingly driven over one of the subinverters S1, S2, wherein each subinverter is driving one direction of the alternating current.

Each subinverter S1, S2 comprises a full bridge and a switchable freewheel path, both configured to drive a current between the subinverter AC terminals in a driving direction, and configured to block a current between the subinverter AC terminals in a blocking direction opposite the driving direction. The switchable freewheel path may be configured to be potential-free, or at least temporarily decoupled from the DC terminals, so that potential discontinuities at the DC terminals of the inverter known from other topologies can be avoided. Several embodiments of a subinverter are shown in FIGS. 2 to 5. An inverter may comprise subinverters of the same embodiment, or subinverters of different embodiments.

Figure 2:
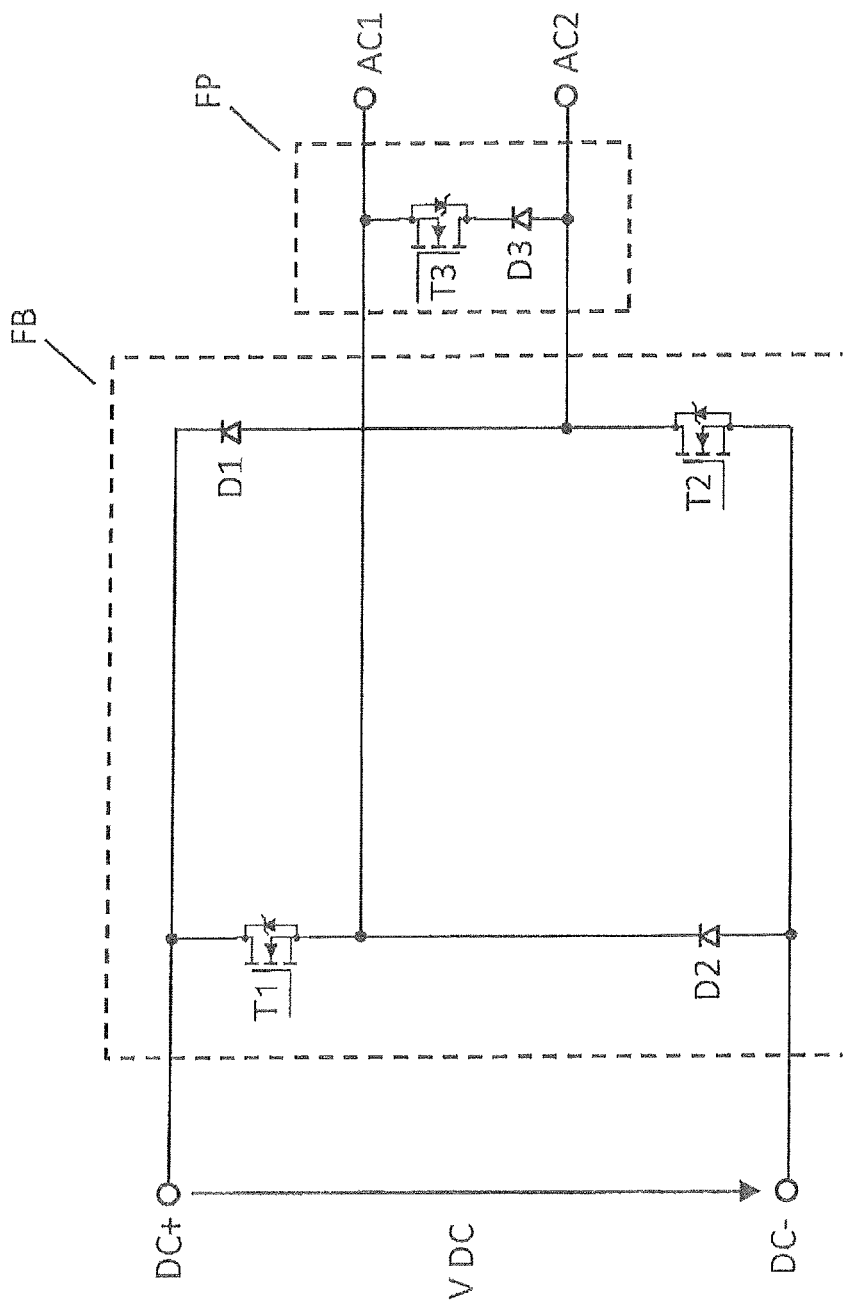
FIGS. 2 to 5 show circuit arrangements of single subinverters as embodiments of the invention.

FIG. 2 shows a subinverter with a full bridge FB, which in general comprises four semiconductor elements in H-configuration. Since the subinverter is configured to drive a current only in one direction, two of the semiconductor elements may be replaced by diodes D1, D2 arranged to block a current in the blocking direction. The other two semiconductor elements are formed by semiconductor switches T1, T2. DC terminal DC+ is connected to AC terminal AC1 via switch T1, while DC terminal DC− is connected to AC terminal AC2 via switch T2. DC terminal DC− is connected to AC terminal AC1 via diode D2, while DC terminal DC− is connected to AC terminal AC2 via diode D1. The AC terminals AC1, AC2 are connected to the two branches of the full bridge. A third semiconductor switch T3 and a third diode D3 are connected in series between the AC terminals AC1, AC2, thereby forming a switchable freewheel path FP. The diode D3 is arranged to block a current in the blocking direction of the subinverter.

Figure 3:
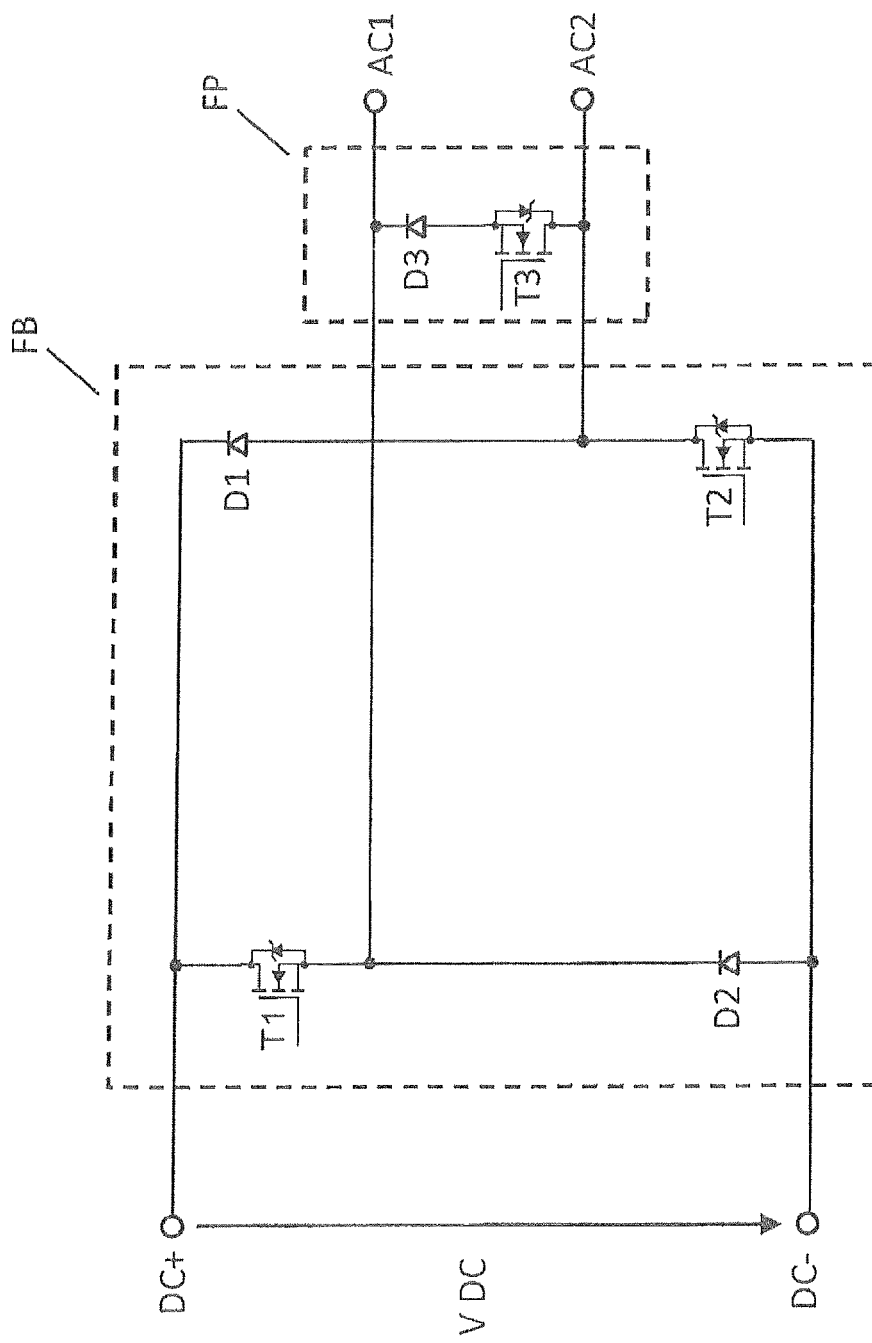

The semiconductor switches T1, T2, T3 may be MOSFET switches with internal, parasitic diodes, as shown. Other types of switches or a mix of different switch types are contemplated as well. FIG. 3 shows a subinverter configuration differing from the one of FIG. 2 in that the semiconductor switch T3 and the diode D3 of the freewheel path FP are exchanged.

Figure 4:
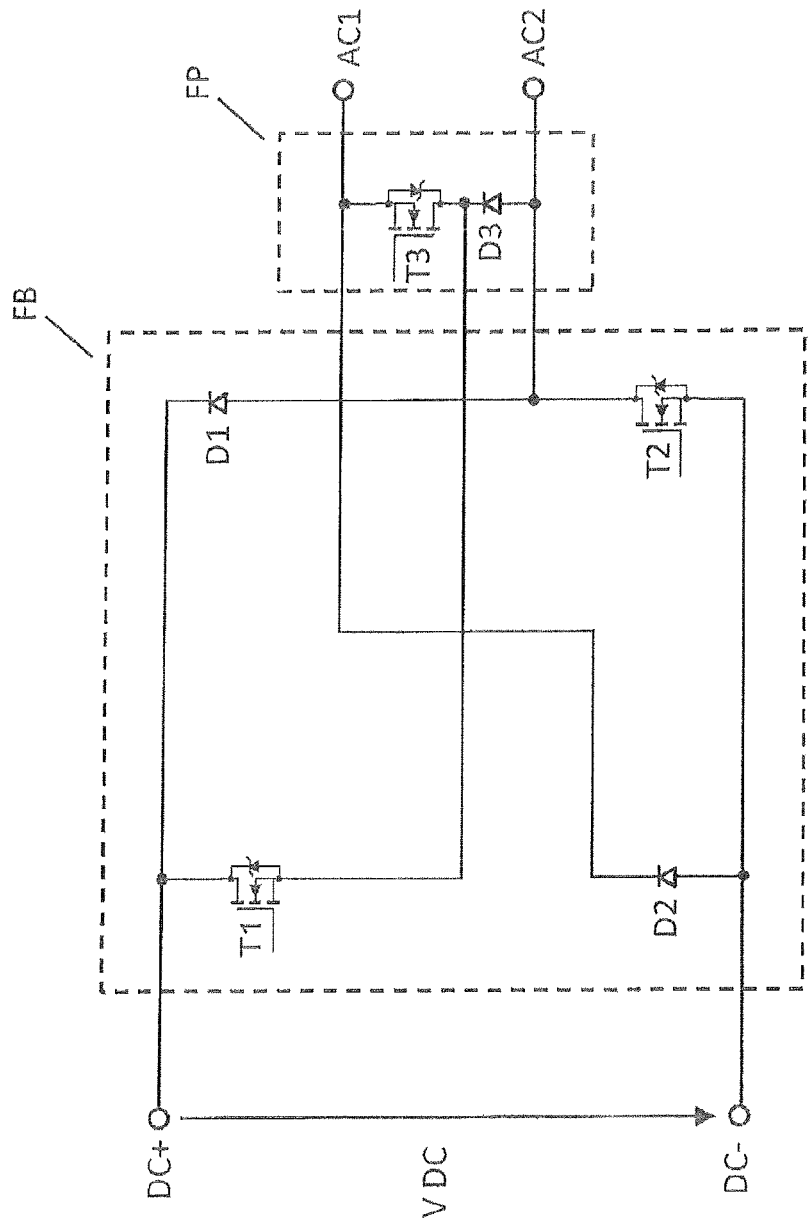

A third embodiment of a subinverter is shown in FIG. 4. Here, the full bridge FB again comprises two semiconductor switches T1, T2, and two diodes D1, D2, while freewheel path FP is formed by semiconductor switch 13 and diode D3 arranged between the AC terminals AC1, AC2. One full bridge branch, formed by switch T2 and diode D1, may be directly connected to AC terminal AC2, while the other full bridge branch is split up. As shown, diode D2 may be directly connected to AC terminal AC1, while switch T1 may be connected to a center point between switch T3 and diode D3 of freewheel path FP, so that DC terminal DC+ is connected to AC terminal AC1 via switches T1 and T3. Therefore, T3 may as well be regarded as part of the full bridge in this (and the following) embodiment.

Figure 5:
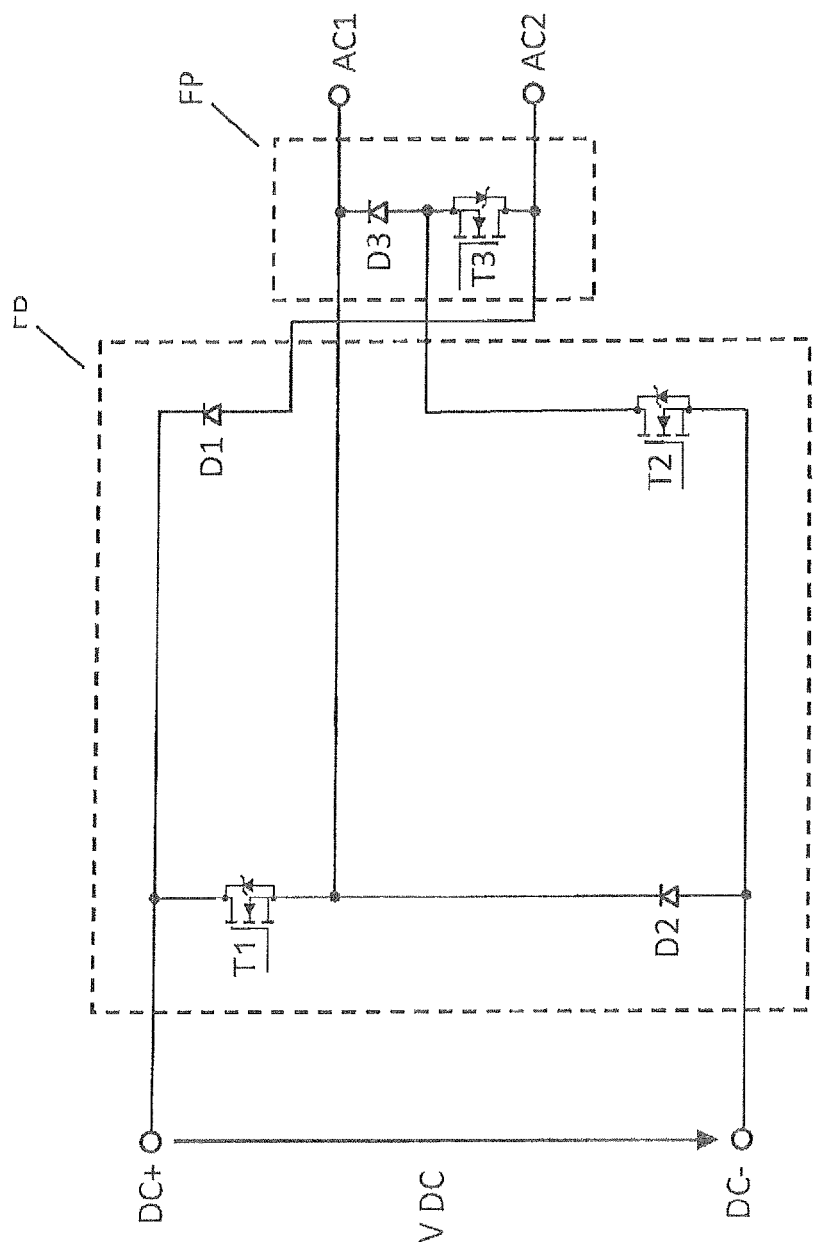

In a fourth embodiment, illustrated in FIG. 5, the full bridge branch formed by semiconductor switch T1 and diode D2 may be directly connected to AC terminal AC1, while the full bridge branch formed by switch T2 and diode D1 is split up. As shown, diode D1 may be directly connected to AC terminal AC2, while DC terminal DC− is connected to AC terminal AC2 via switches T2 and T3.

Other configurations of switches and diodes may be considered as well, as long as they are capable to drive a current between the AC terminals AC1, AC2 in a driving direction, and configured to block a current between the AC terminals AC1. AC2 in a blocking direction opposite the driving direction. With all embodiments shown, the current in the driving direction only flows over the switches T1, T2, T3 in a blocking direction of their internal, parasitic diodes, so that in regular operation, a current flow over the parasitic diode and thus a built up of a recovered charge in these parasitic diodes is minimized or prevented. This may lead to a more efficient switching of the semiconductor switches, such as MOSFETs, and an improved EMC performance of the inverter compared to the case where current is allowed to flow over the switches in both directions, even if a separate freewheel diode is provided to each switch.

Figure 6:
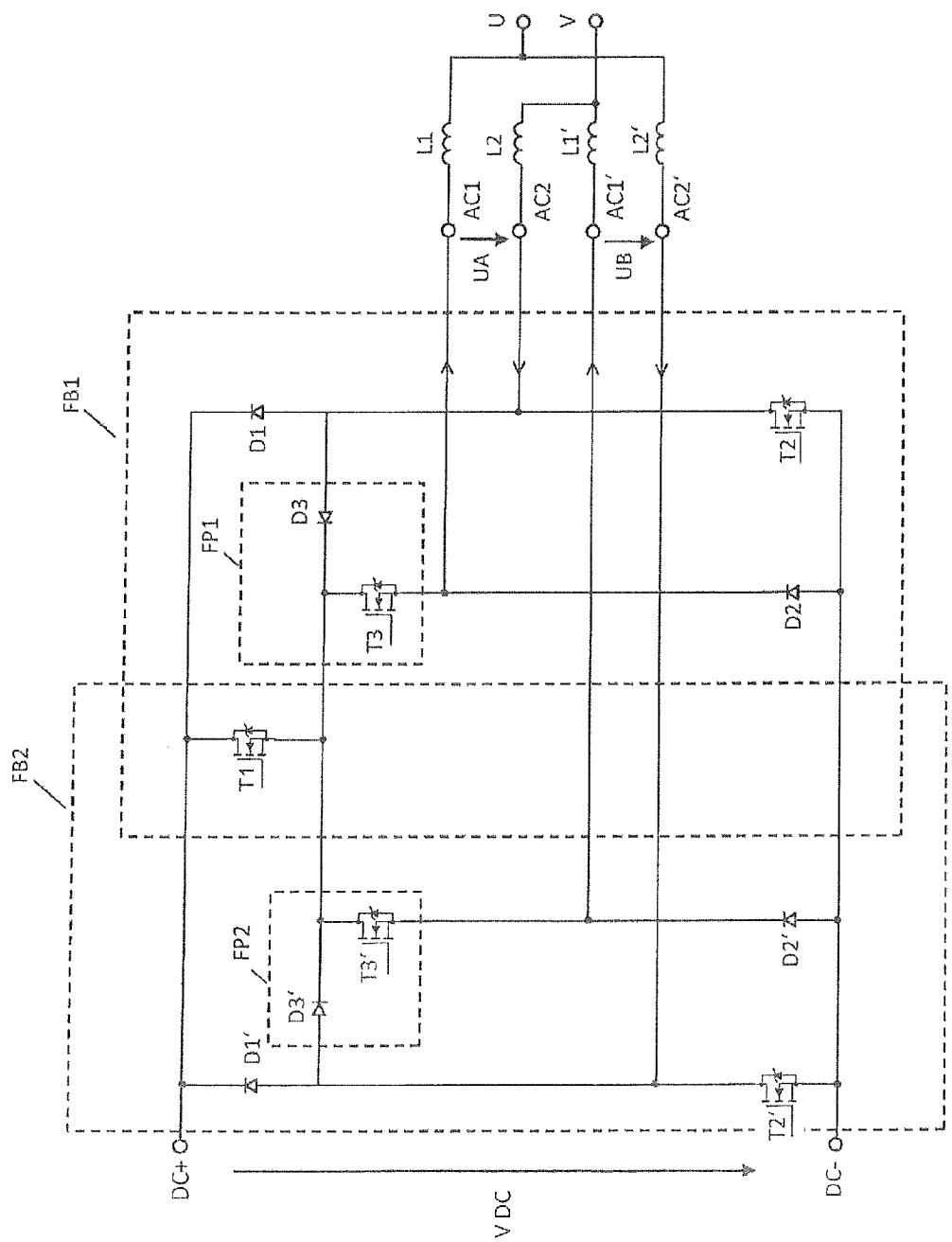
FIG. 6 shows a circuit arrangement of an inverter with a reduced number of components.

To further reduce the number of components within a bidirectional inverter, the subinverters S1, S2 may also share elements, as shown in FIG. 6. The circuit arrangement shown may be directly derived, when inserting two subinverters as shown in FIG. 4 as subinverters S1, S2 of FIG. 1, forming a first full bridge FB1 and a first freewheel path FP1, and a second full bridge FB2 and a second freewheel path FP2. In this case, semiconductor switch T1 may be shared between the first and second full bridges FB1, FB2, and forms a common part of the full bridges of both subinverters. In a similar manner not shown, a bidirectional inverter with reduced number of components can be achieved when combining two subinverters as illustrated in FIG. 5. In this case, the two subinverters may share a common semiconductor switch T2. Other configurations of bidirectional inverters with components, including diodes, shared between the subinverters may be possible.

Figure 7:
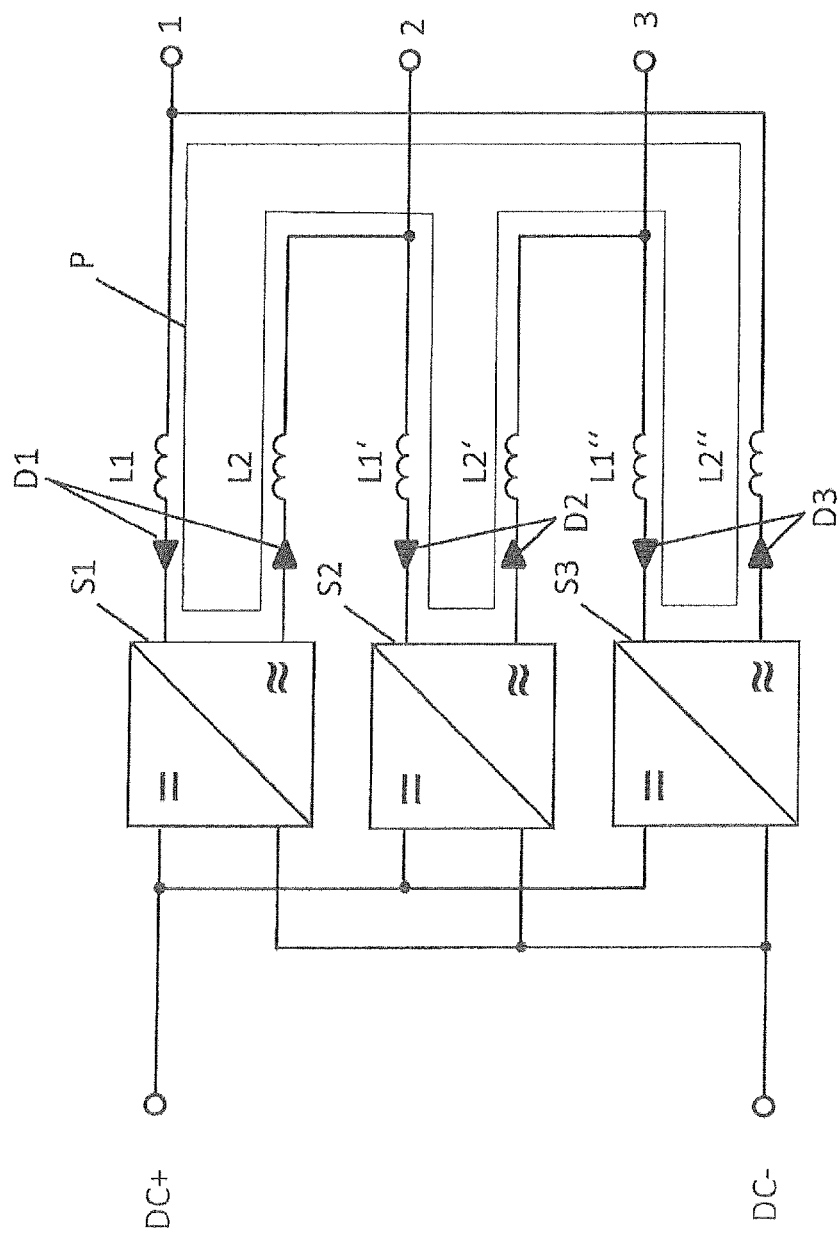
FIGS. 7 and 8 show bidirectional inverters with three subinverters.

In a further aspect of the invention, the concept of providing a bidirectional inverter comprising separate subinverters for different current directions may be extended to three-phase grids. In this case, as shown in FIG. 7, the bidirectional inverter may comprise first, second, and third grid AC terminals 1, 2, 3, and first second and third subinverters S1, S2, S3. Each subinverter comprises two subinverter AC terminals, the subinverter AC terminals being connected to two different ones of the grid AC terminals 1, 2, 3 via corresponding inductors L1, L2, L1', L2', L1", L2", so that each grid AC terminal is connected to two of the subinverters. For example, the first subinverter S1 is connected to the first grid AC terminal 1 and the second grid AC terminal 2, the second subinverter S2 is connected to the second grid AC terminal 2 and the third grid AC terminal 3, and the third subinverter S3 is connected to the third grid AC terminal 3 and the first grid AC terminal 1. On the DC side, all subinverters S1, S2, S3 are connected in parallel to the DC terminals DC+, DC−. Again, each subinverter S1, S2, S3 is configured to drive a current between the AC terminals in a driving direction D1, D2, D3, and configured to block a current between the AC terminals in a blocking direction opposite the driving direction. The driving directions D1, D2, D3 of each subinverter S1, S2, S3 are again indicated by corresponding arrows. The topologies shown in FIGS. 2 to 5 may be used for the subinverters S1, S2, S3. Reducing the number of components by sharing components between subinverters, as described in conjunction with FIG. 6, is contemplated as well.

The driving directions D1, D2, D3 of the first, second and third subinverter indicated by the arrows assigned to the subinverters are oriented uniformly along a closed path P formed by the connections of the subinverters to the grid AC terminals. In FIG. 7, path P extends from inductor L1, along subinverter S1, inductors L2 and L1', subinverter S2, inductors L2' and L1", subinverter S3, inductor L2", and back to inductor L1. Along path P, all driving directions D1, D2, D3 of the subinverters have the same orientation. In this case, a current flowing between, for example, grid AC terminal 1 and grid AC terminal 2 in a first direction, is driven by subinverter S1, while a current in the opposite direction is driven by subinverters S2 and S3, which are effectively connected in series between the grid AC terminals 1 and 2 via inductors L1', L2', L1", and L2". Similarly, a current flowing between any two of the grid AC terminals are either driven by the one single subinverter arranged between those grid AC terminals, or the corresponding other two subinverters, depending on the current direction. It is worth while mentioning, that also for the inverter connected to the two-phase grid, the driving directions D1, D2 of the subinverters S1, S2 are oriented uniformly along a closed path formed by the connections of the subinverters to the grid AC terminals. For example, in FIG. 1, the closed path extends from inductor L1, along subinverter S1, inductors L2 and L1, subinverter S2, inductor L2', and back to inductor L1, with the driving directions D1, D2 indicated by the arrows assigned to the subinverters S1, S2.

Figure 8:
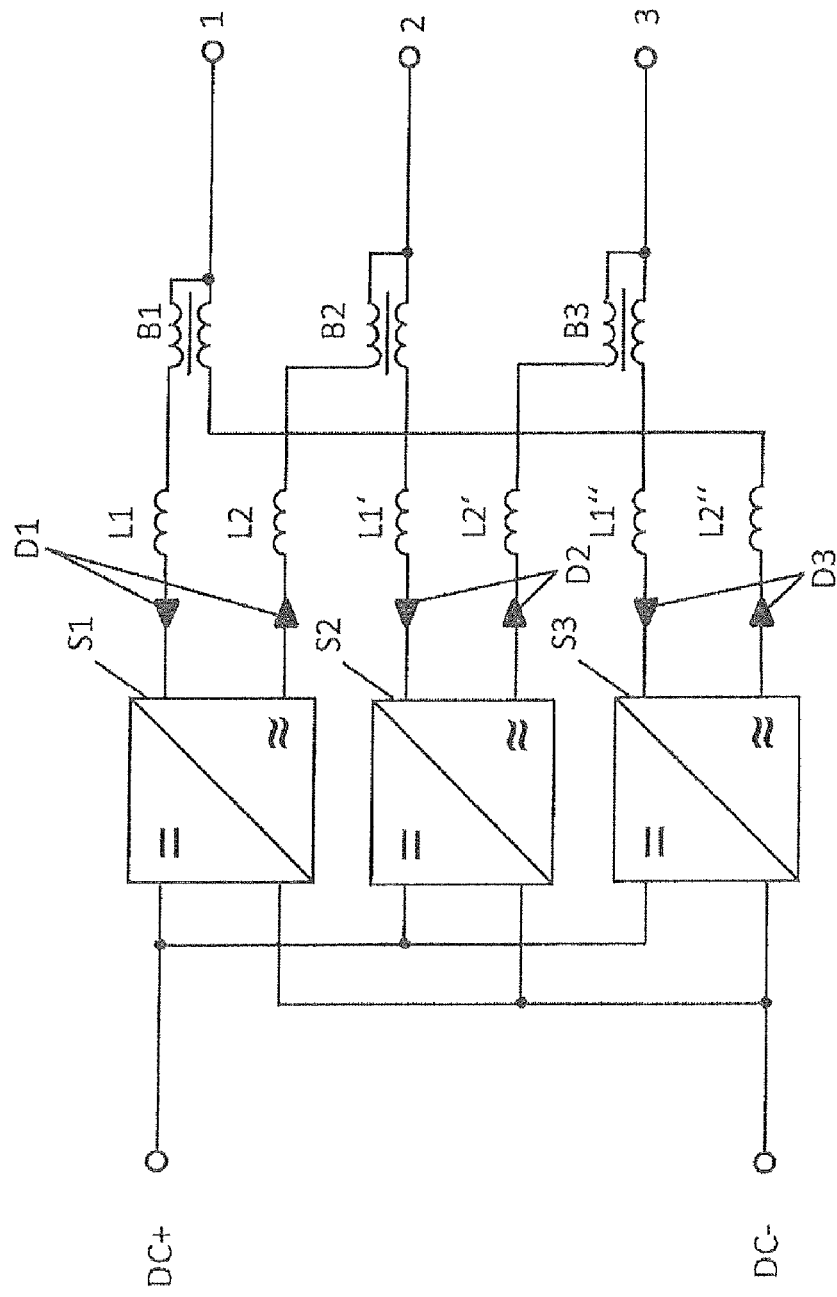

FIG. 8 shows a variant of coupling the subinverters to grid AC terminals. Here, each grid AC terminal 1, 2, 3 is connected to inductors B1, B2, B3, which further are connected to different ones of the subinverters S1, S2, S3. The inductors B1, B2, B3 may be provided as windings on a common core, and may be additive or substitutive to the separate inductors L1, L2, L1', L2', L1", L2". As is readily understood, the coupling inductors L1, L2, L1', L2', L1", L2" may also be formed as leakage inductors of the bridge inductors B1, B2, B3. The use of inductors B1, B2, B3 additive to or instead of separate inductors L1, L2, L1', L2', L1", L2" is not limited to the bidirectional inverter for a three-phase grid, but may be implemented for the two-phase grid inverter of FIG. 1 as well.

At the grid AC terminals, additional filter elements may be present, for example at least one filter inductor that has a greater inductance value, particularly an at least five times greater inductance value than the inductors L1, L2, L1', L2', L1", L2", or the inductors B1, B2, B3. As a result, the actual filter function may be taken over by the filter inductor, with the result that only one large magnetic component per pole of the grid voltage is required.

Many variations and modifications may be made to the embodiments of the invention without departing substantially from the spirit and principles of the invention. All such modifications and variations are intended to be included herein within the scope of the present invention, as defined by the following claims.

What is claimed is:

1. A bidirectional inverter comprising DC terminals and being connectable to a grid via grid AC terminals, the inverter comprising a first subinverter and a second subinverter, both subinverters having input terminals connected together in parallel to the DC terminals, and being connected in parallel to the grid AC terminals by subinverter AC terminals, each subinverter comprising: a full bridge and a switchable freewheel path, both first and second subinverters configured to drive a current between the grid AC terminals in a driving direction, and configured to block a current between the grid AC terminals in a blocking direction opposite the driving direction, wherein the driving direction of the first subinverter is the blocking direction of the second subinverter.

2. The inverter of claim 1, wherein each full bridge comprises two semiconductor switches and two diodes, the diodes being arranged to block a current in the respective blocking direction.

3. The inverter of claim 1, wherein the full bridges each comprise MOSFETs.

4. The inverter of claim 1, wherein each freewheel path comprises a semiconductor switch and a diode connected in series, the diode being arranged to block a current in the respective blocking direction.

5. The inverter of claim 1, wherein each freewheel path comprises a MOSFET.

6. The inverter of claim 1, wherein each freewheel path is configured to be at least temporarily decoupled from the DC terminals.

7. The inverter of claim 1, wherein the inverter comprises a semiconductor switch, which forms a common part of the full bridges of the first subinverter and the second subinverter.

8. The inverter of claim 1, wherein each full bridge is configured to prevent a current flow over parasitic diodes of the corresponding semiconductor switches in a regular operation of the inverter.

9. The inverter of claim 1, further comprising a first pair of inductors arranged between the subinverter AC terminals of the first subinverter and the grid AC terminals, and a second pair of bridge inductors arranged between the subinverter AC terminals of the second subinverter and the grid AC terminals.

10. The inverter of claim 8, wherein one inductor of the first pair of inductors and one inductor of the second pair of inductors are provided as windings on a common core.

11. The inverter of claim 1, wherein the first subinverter and the second subinverter are connected to the AC terminals via common inductors.

12. A bidirectional inverter comprising two DC terminals, a first grid AC terminal and a second grid AC terminal, the inverter comprising:
  a first full bridge comprising a first AC terminal and a second AC terminal and a second full bridge comprising a first further AC terminal and a second further AC terminal, both full bridges having first and second input terminals coupled to the two DC terminals, respectively, wherein the first and second full bridge inputs are in parallel with one another; and
  a plurality of coupling inductors interlinking the AC terminals of the first and second full bridges so as to facilitate, in each of the full bridges, a current flow only in a single direction, thereby providing a switchable, potential-free freewheel path to each of the full bridges, wherein each full bridge is configured to drive a current in excess of a leakage current of semiconductor switches included in the full bridges in a direction flowing out of the first AC terminal and the first further AC terminal and into the second AC terminal and the second further AC terminal.

13. The inverter of claim 12, wherein the switchable freewheel path between the AC terminals of the first full bridge drives a current from the second AC terminal towards the first AC terminal, while blocking a current in the respective opposite direction, and wherein the switchable freewheel path between the AC terminals of the second full bridge drives a current from the second further AC terminal towards the first further AC terminal, while blocking a current in the respective opposite direction.

14. The inverter of claim 12, wherein a first connection point between the first AC terminal and the second further AC terminal is coupled together directly or via filter elements to the first AC grid terminal, and a second connection point between the first further AC terminal and the second AC terminal is coupled together directly or via filter elements to the second AC grid terminal.

15. The inverter of claim 14, wherein the plurality of coupling inductors comprises a first coupling inductor disposed between the first connection point and the first AC terminal, a second coupling inductor disposed between the first connection point and the second further AC terminal, a third coupling inductor disposed between the second connection point and the first further AC terminal, and a fourth coupling inductors disposed between the second connection point and the second AC terminal.

16. The inverter of claim 15, wherein the first connection point and the second connection point are coupled to the first AC output terminal and to the second AC output terminal, respectively, via filter elements, wherein the filter elements comprise filter inductors with an inductance value being larger than 5 times an inductance value of the coupling inductors.

17. The inverter of claim 16, wherein the coupling inductors are formed by stray inductances of a corresponding one of the filter inductors.

18. The inverter of claim 17, wherein the inductances of the filter inductors and the inductances of the coupling inductors are dimensioned so as to substantially suppress a current through corresponding body diodes of the semiconductors switches of the first full bridge and the second full bridge.

19. A bidirectional inverter comprising DC terminals and being connectable to a three-phase grid via a first, a second and a third grid AC terminal, the inverter comprising a first subinverter, a second subinverter, and a third subinverter, wherein all inputs of the subinverters are connected in parallel together with the DC terminals, and wherein each subinverter is connected to a respective two of the grid AC terminals, and each subinverter comprises a full bridge and a switchable freewheel path, both being configured to drive a current between the respective two of the grid AC terminals in a driving direction, and configured to block a current between the respective two of the grid AC terminals in a blocking direction opposite the driving direction, wherein the first subinverter is connected to the first AC terminal and the second AC terminal, the second subinverter is connected to the second AC terminal and the third AC terminal, and the third subinverter is connected to the third AC terminal and the first AC terminal.

20. The inverter of claim 19, wherein the driving directions of the first, second and third subinverter are oriented uniformly along a closed path formed by the connections of the subinverters to the grid AC terminals.

* * * * *